United States Patent [19]
Lhoest

[11] Patent Number: 5,490,546
[45] Date of Patent: Feb. 13, 1996

[54] INSTALLATION AND METHOD FOR TRANSFERRING PRODUCTS FLOWING OUT UNDER GRAVITY

[75] Inventor: Willy Lhoest, Brussels, Belgium

[73] Assignee: Elveco msj S.A., Brussels, Belgium

[21] Appl. No.: 217,251

[22] Filed: Mar. 24, 1994

[30] Foreign Application Priority Data

Apr. 1, 1993 [FR] France ................... 93 03832

[51] Int. Cl.$^6$ ............................. B65B 1/04; B65B 3/00; B67C 3/00
[52] U.S. Cl. ................... 141/346; 141/347; 141/364; 141/365; 141/383; 141/386; 141/348; 141/351; 141/18; 141/21
[58] Field of Search ................... 141/346, 347, 141/364, 365, 383, 386, 348, 351, 18, 21; 137/614.06, 614

[56] References Cited

U.S. PATENT DOCUMENTS

| 2,737,401 | 1/1953 | Lindsay | 141/346 |
|---|---|---|---|
| 3,870,168 | 3/1975 | Aralt | 214/17 |
| 5,029,624 | 7/1991 | McCunn et al. | 141/346 |
| 5,263,521 | 11/1993 | Brossard et al. | 141/346 |

FOREIGN PATENT DOCUMENTS

| 0092008 | 10/1983 | European Pat. Off. . |
|---|---|---|
| 0384826 | 8/1990 | European Pat. Off. . |
| 2077451 | 10/1971 | France . |
| 2640598 | of 1990 | France . |
| 1034549 | 7/1958 | Germany . |

*Primary Examiner*—J. Casimer Jacyna
*Assistant Examiner*—Timothy L. Maust
*Attorney, Agent, or Firm*—Ladas & Parry

[57] ABSTRACT

The invention relates to devices for transferring, without the risk of contamination, products flowing out under gravity from an upper receptacle (1) or pipe (43) towards a lower receptacle (1) or pipe (16).

The device [according to the invention] includes a hermetic enclosure (19, 45) covering the orifice (18, 44) of one of the receptacles or pipes (16, 43), it being possible for the mouth of the orifice (5, 11) of the other receptacle (1) or pipe to be inserted therein, this other receptacle (1) or pipe [includes closing-off means] including a flange (10, 14) capable of closing the enclosure (19, 45) when the mouth of the other receptacle is inserted therein so that a flow of inert gas can be driven through the inside volume of the hermetic enclosure (19, 14) preventing cross-contamination between the content of the receptacle (1) or pipe (43) and the ambient atmosphere.

The device is particularly applicable to the transfer of hormonal, sterile, toxic products, to cytostatic products, and even to explosive mixtures.

20 Claims, 14 Drawing Sheets

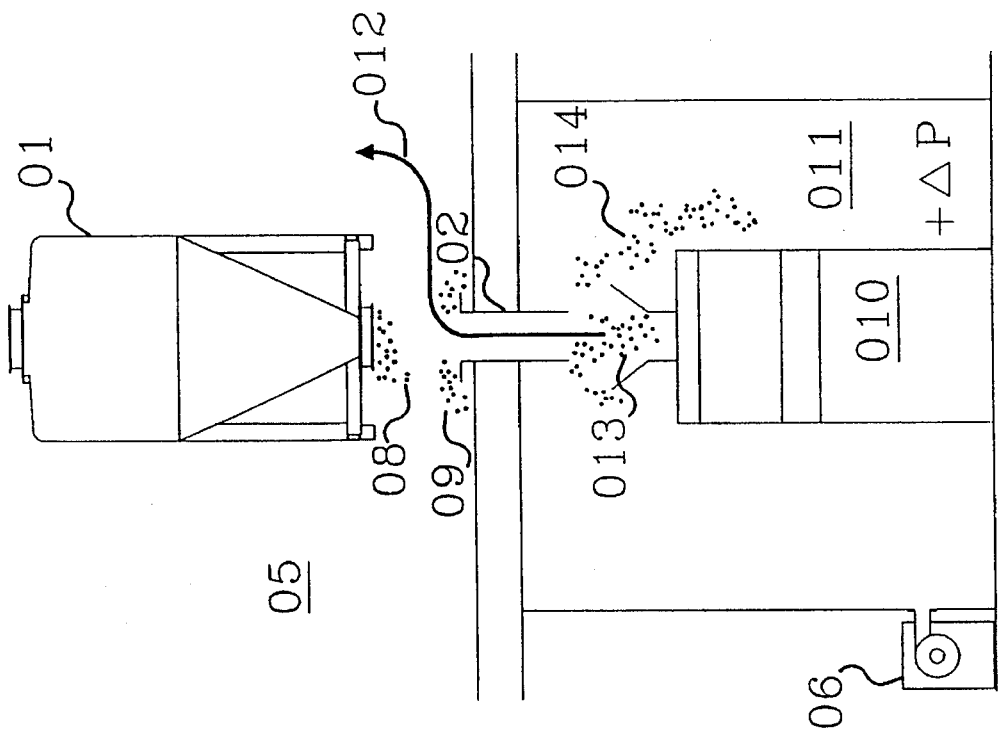
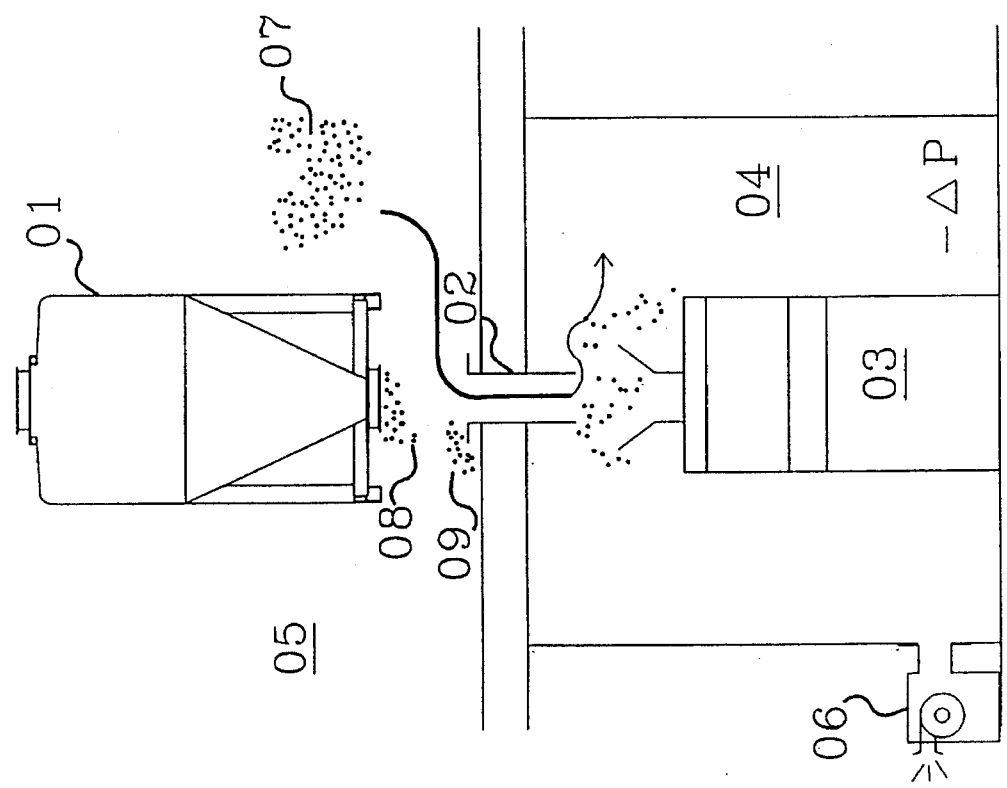

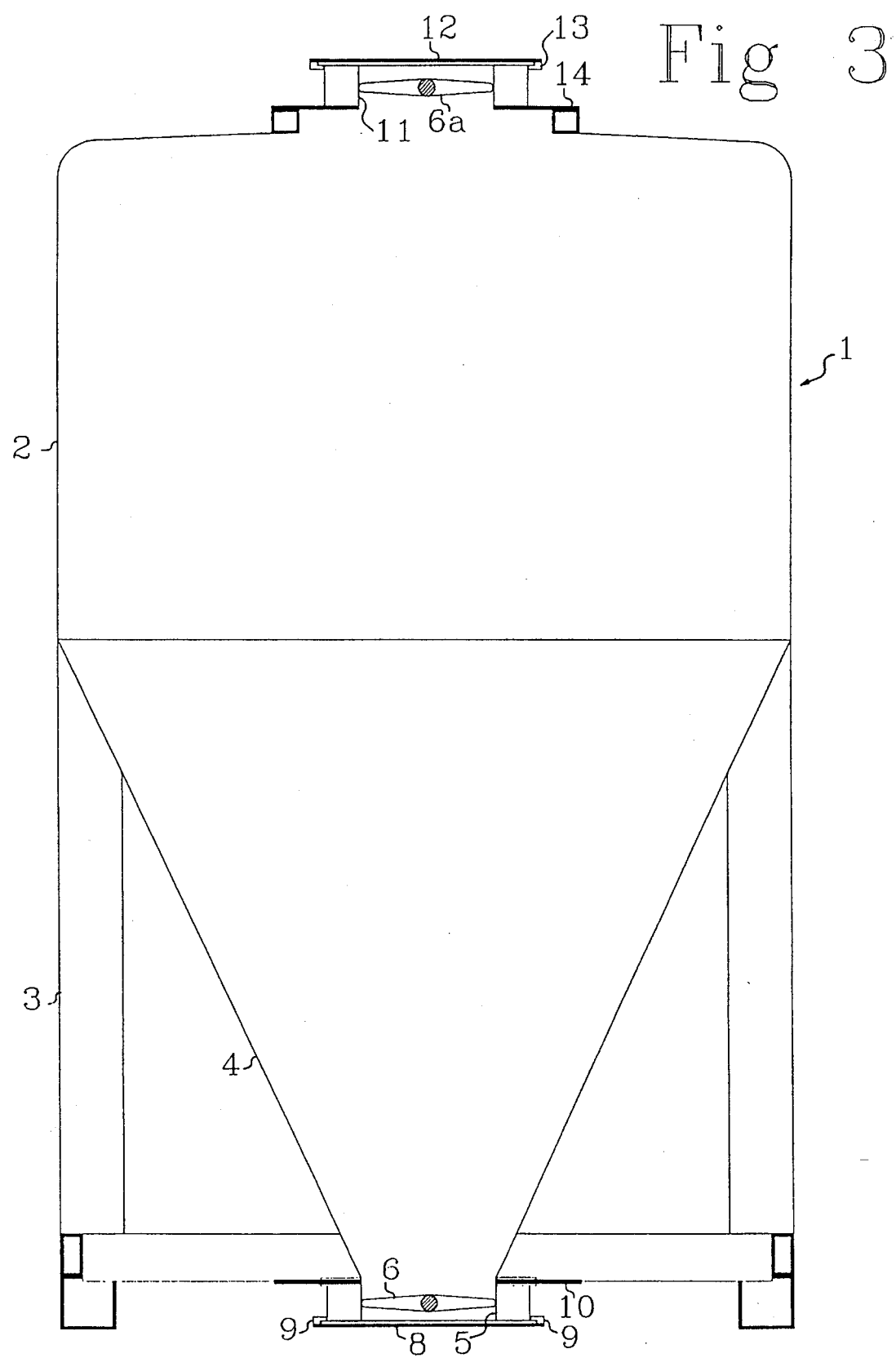

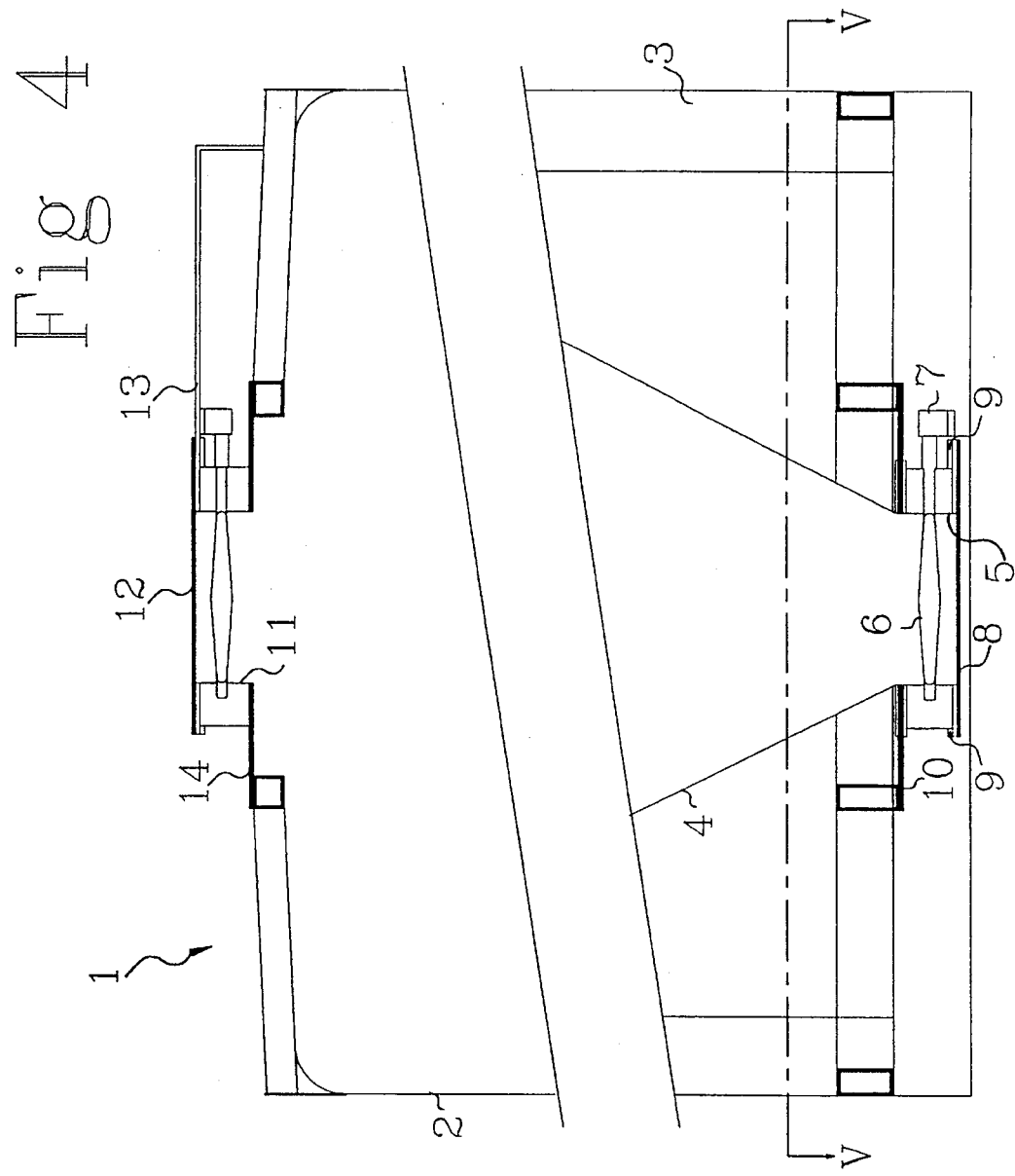

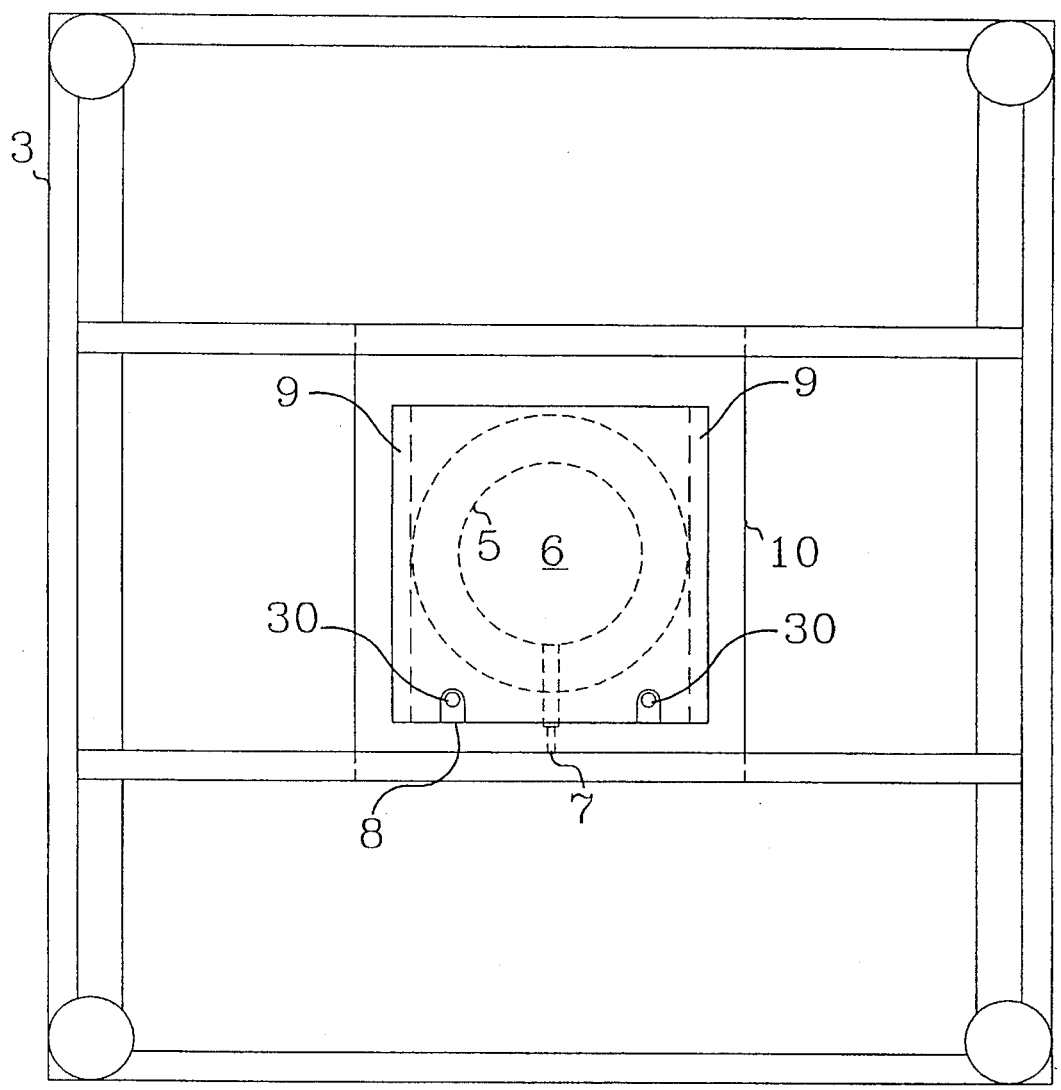

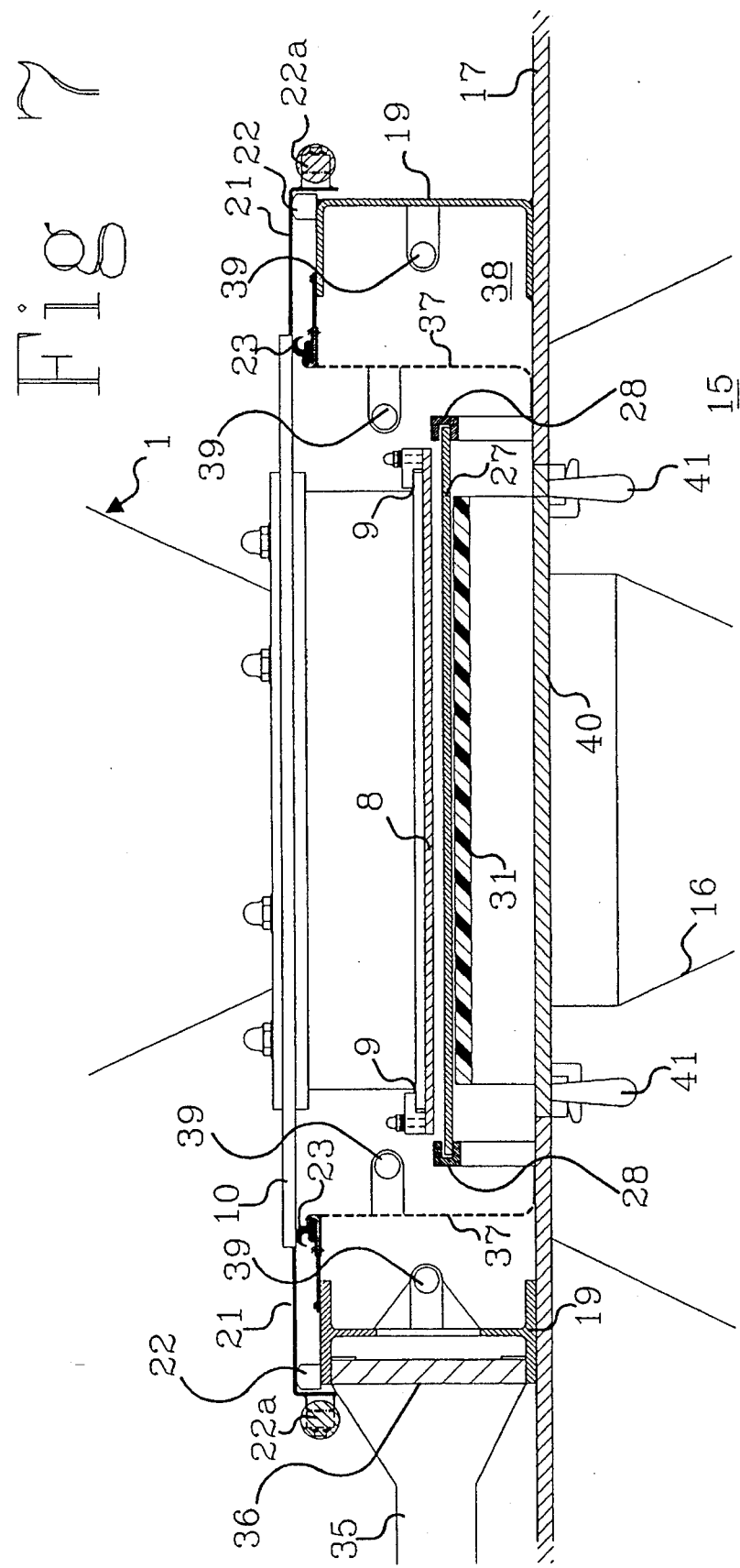

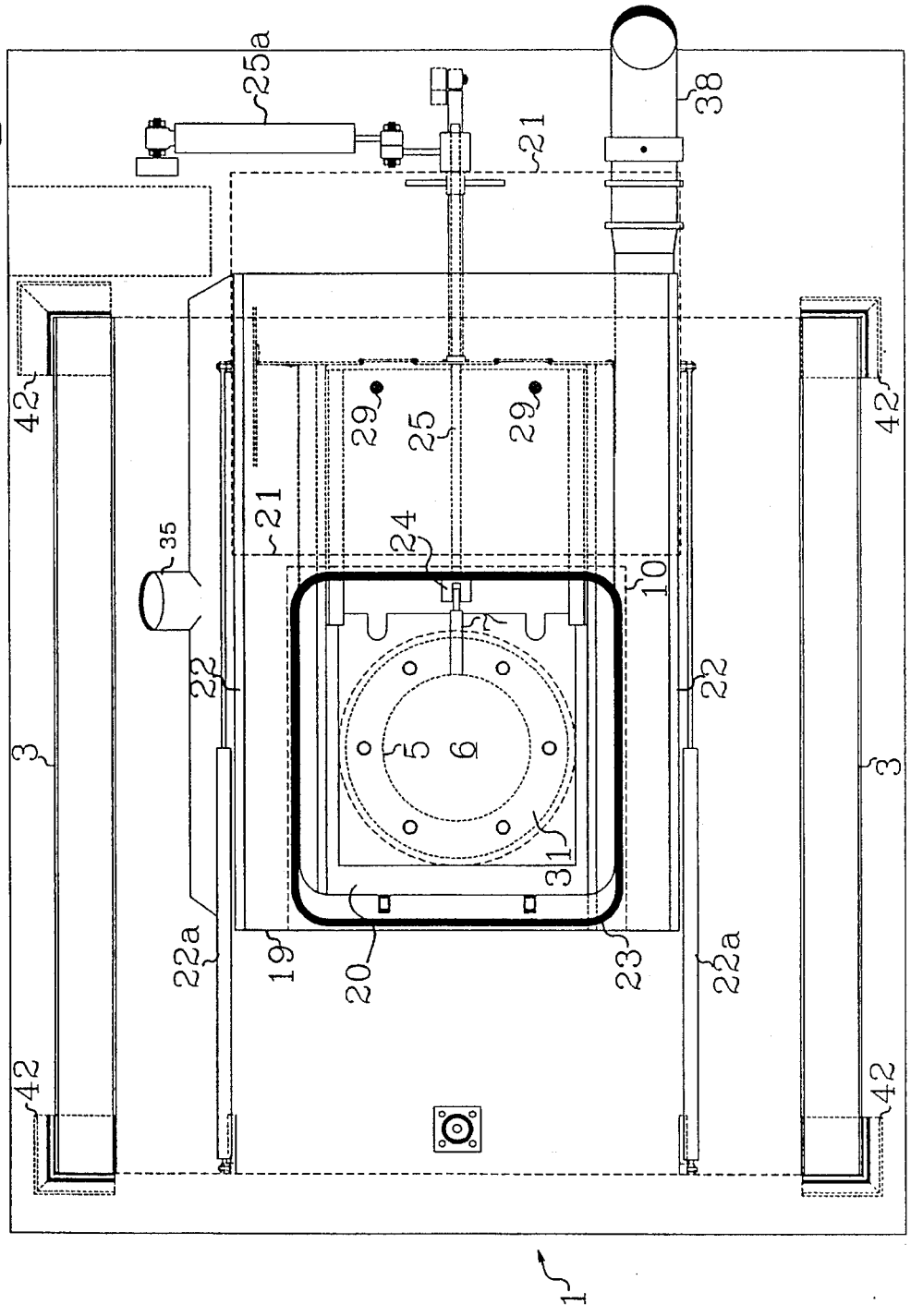

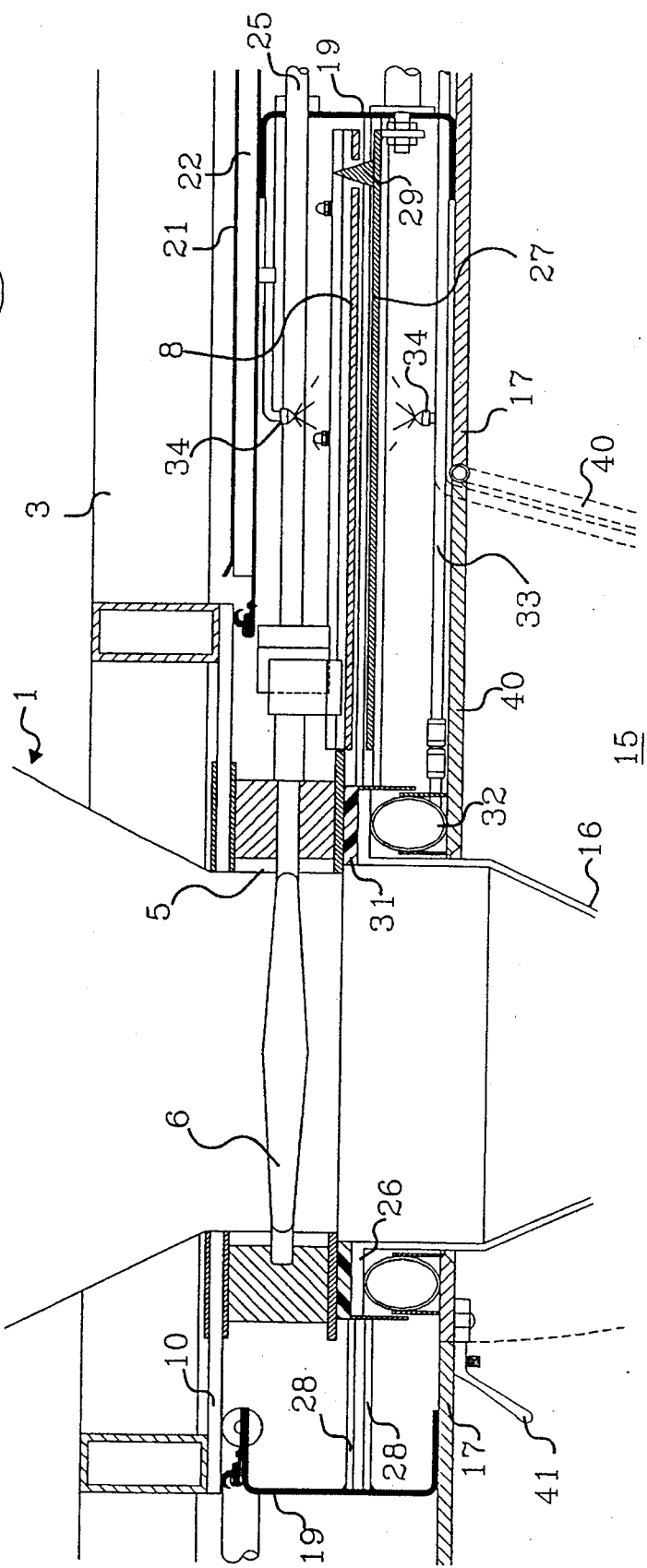

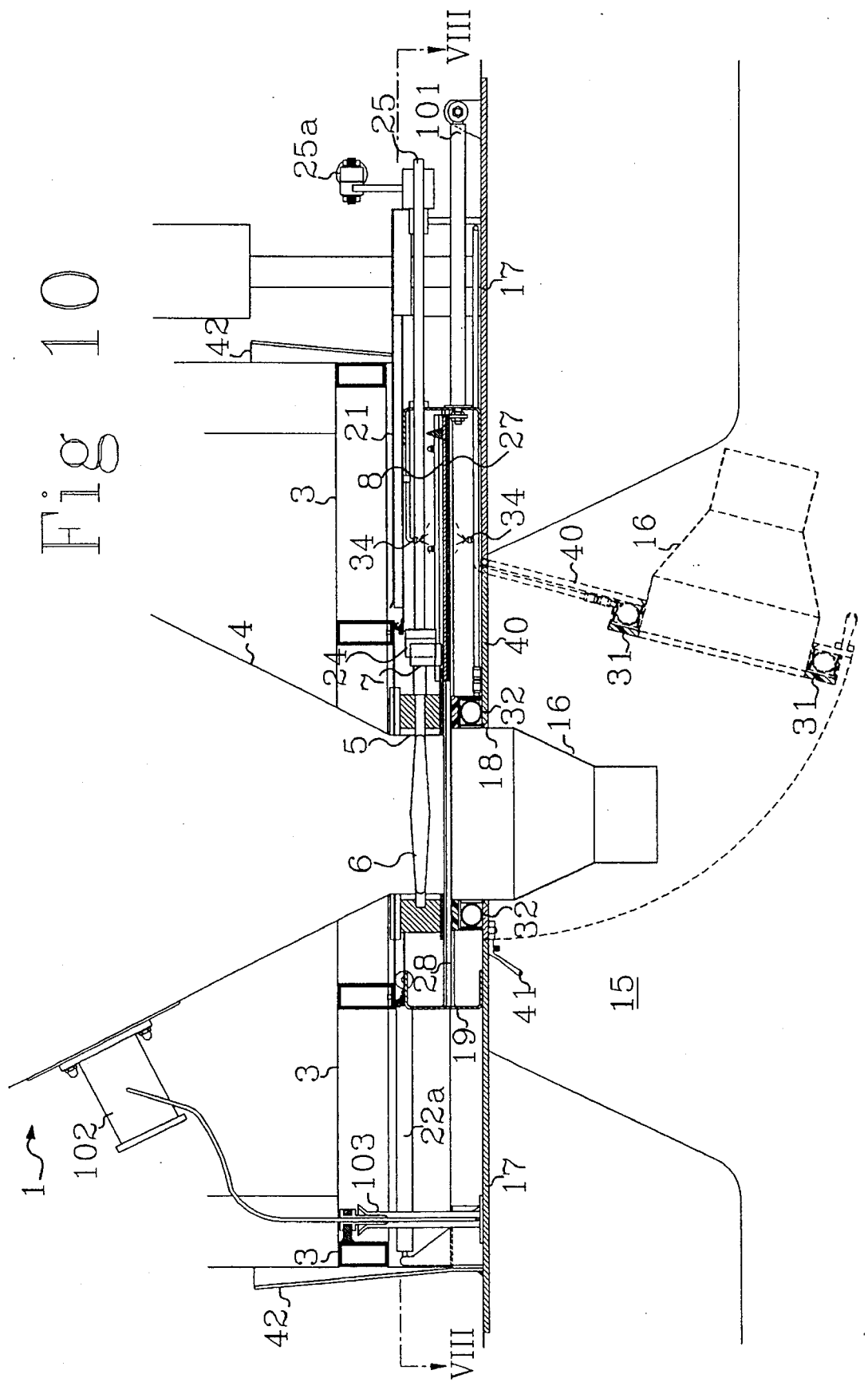

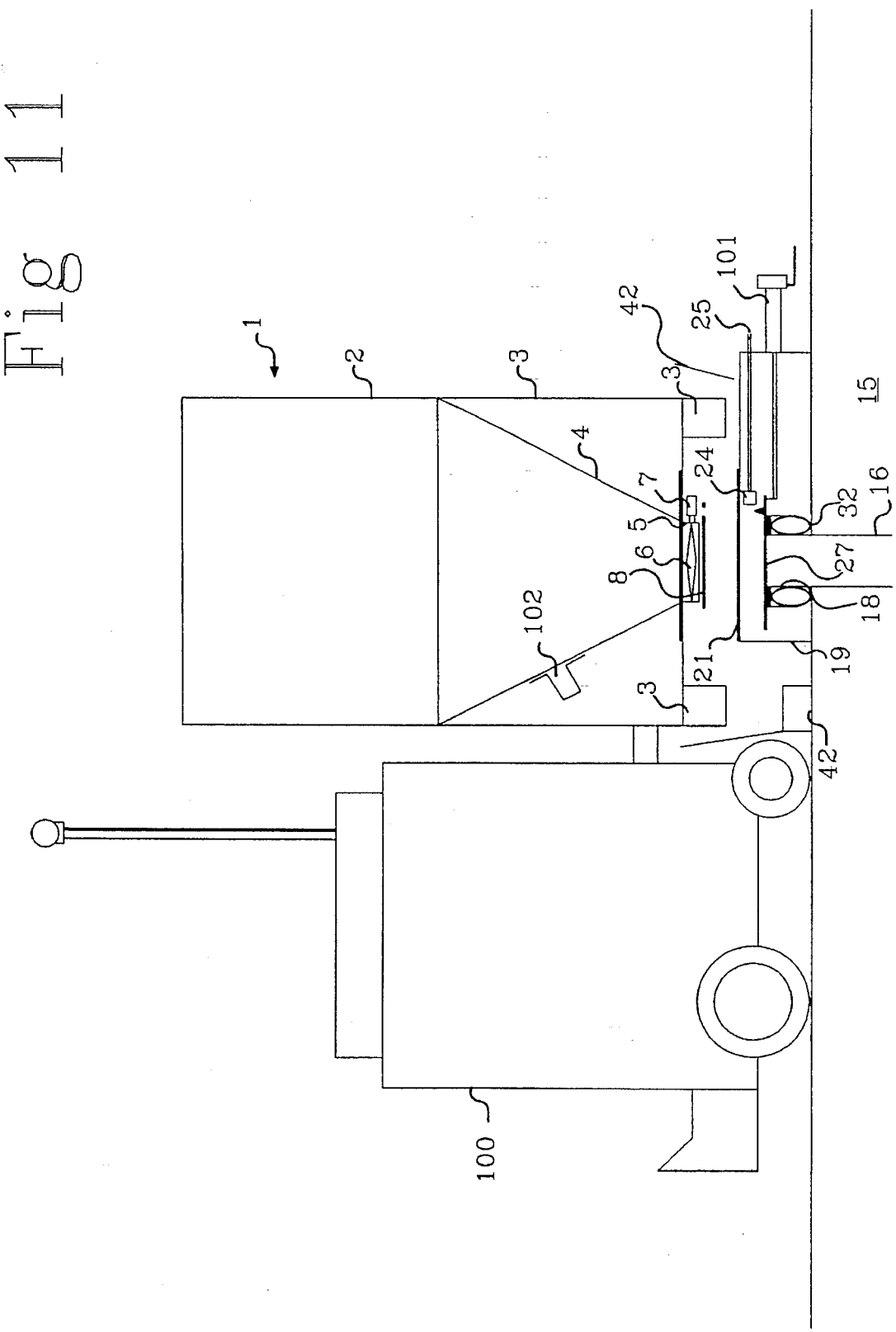

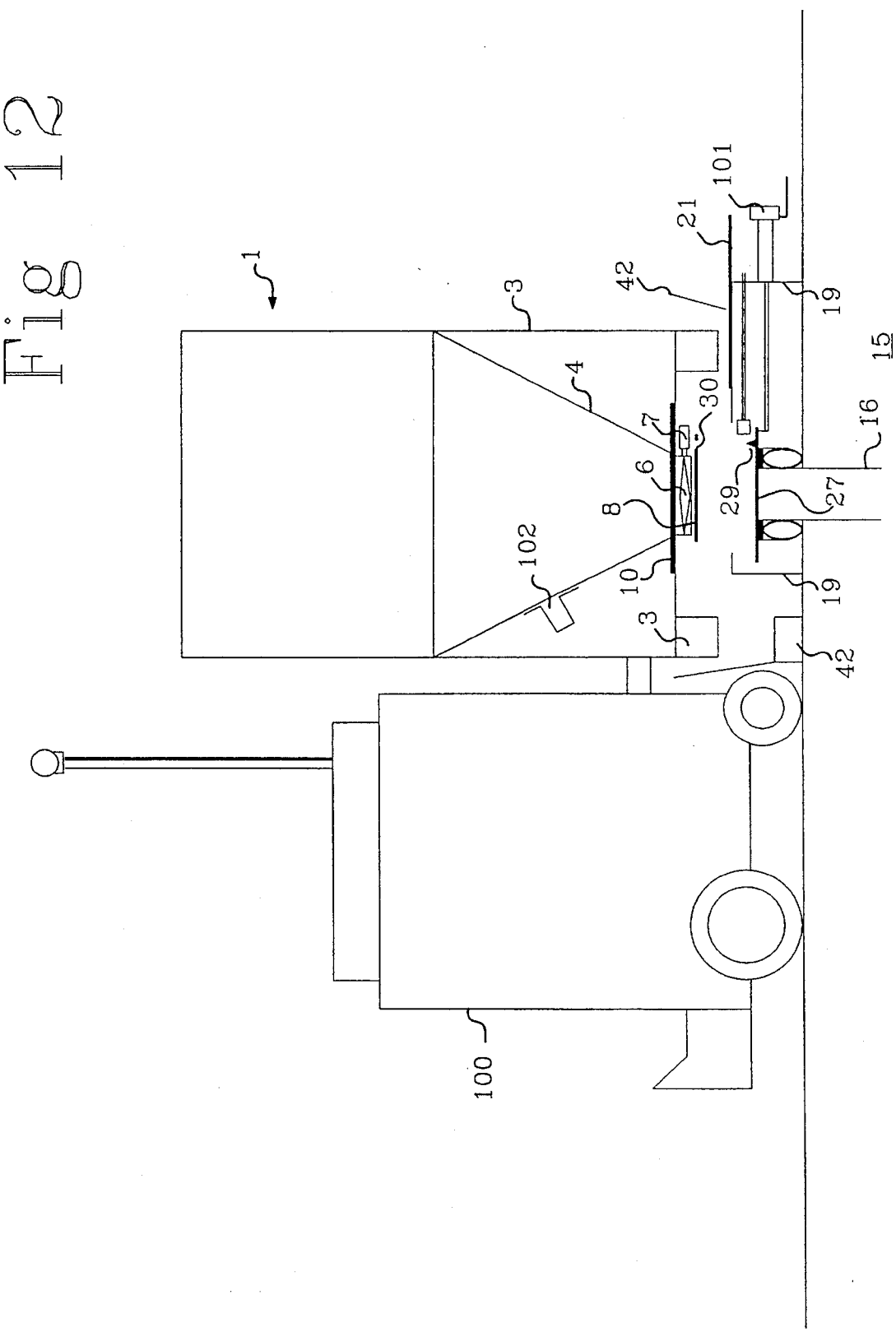

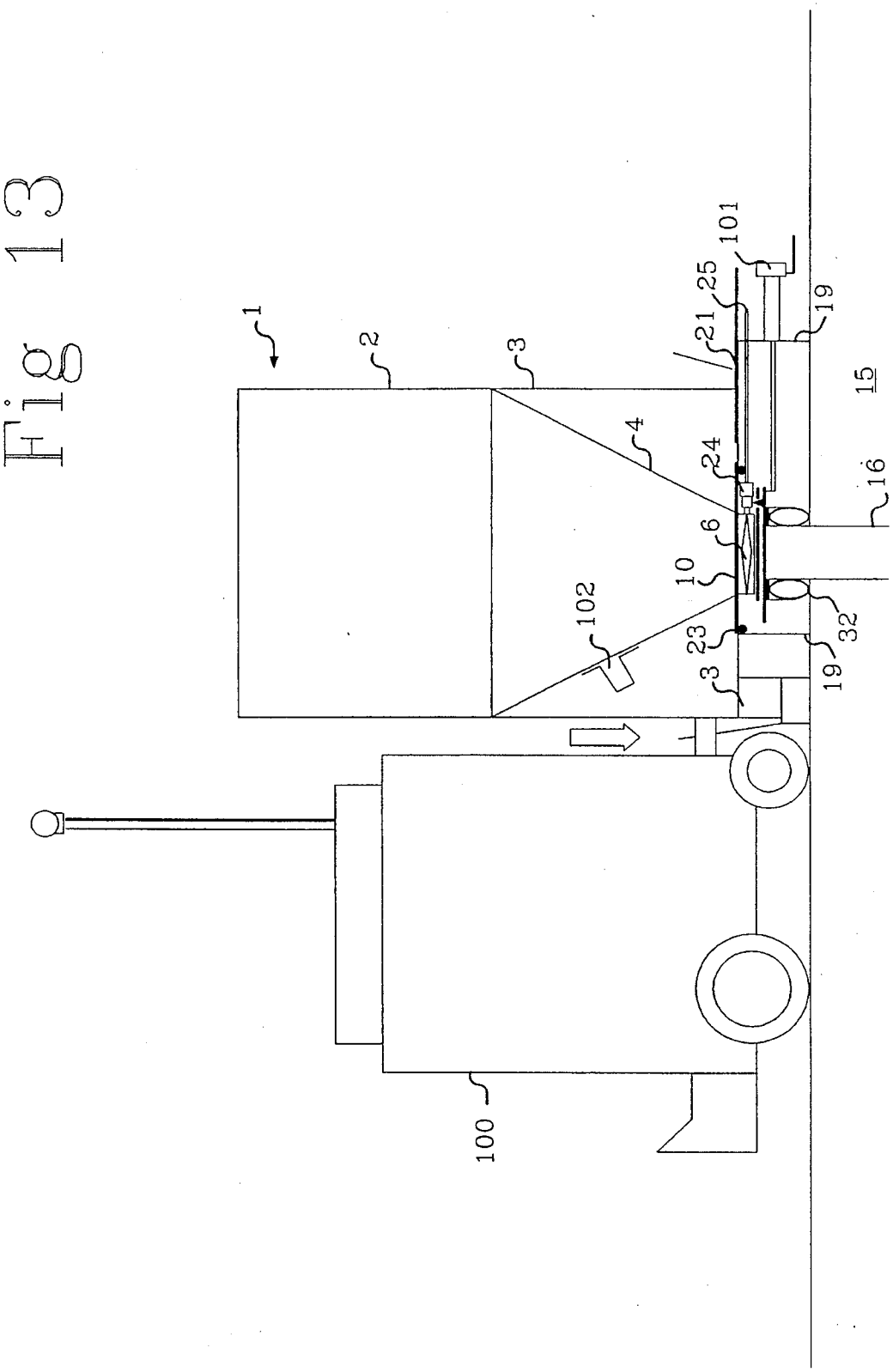

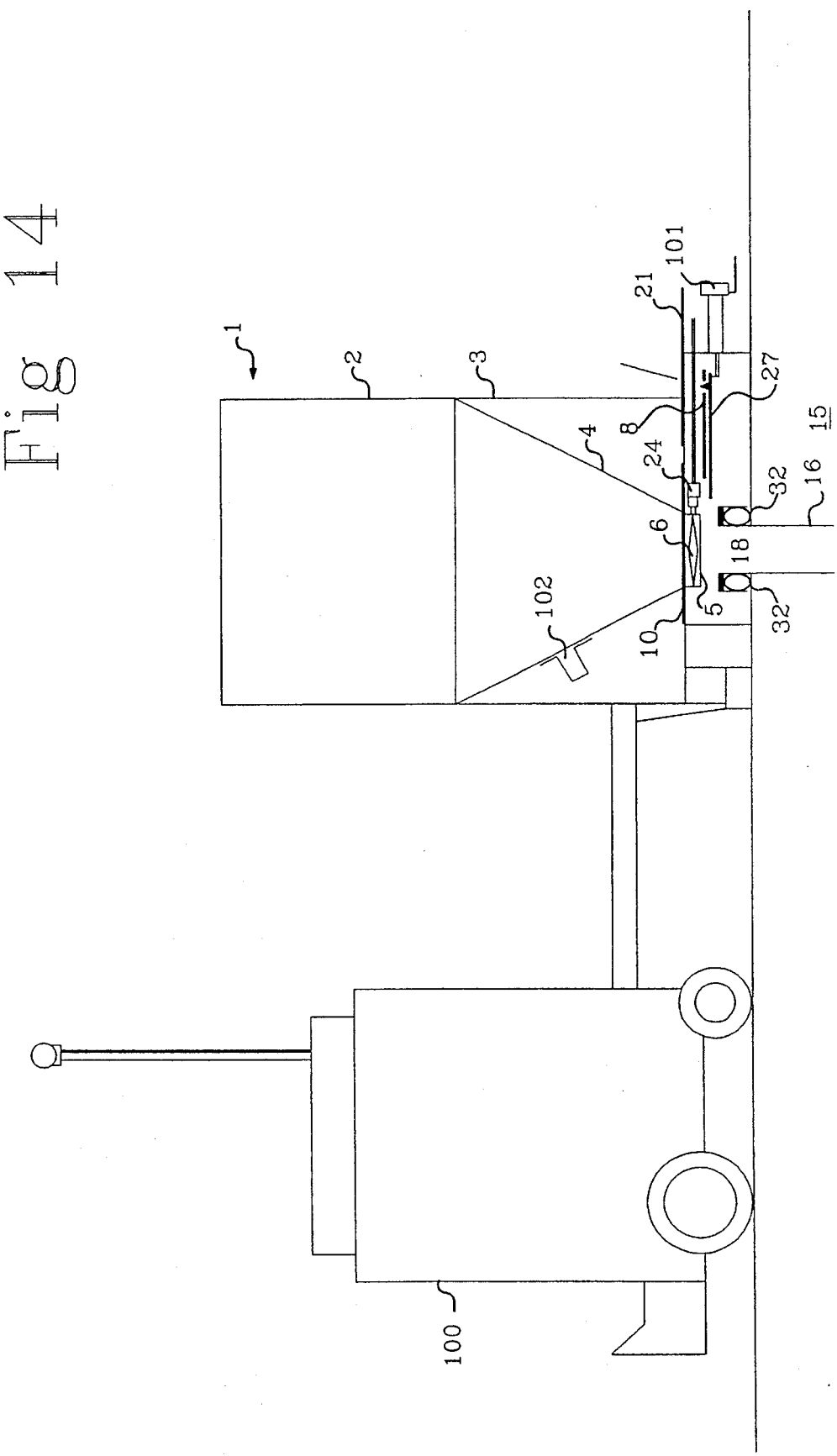

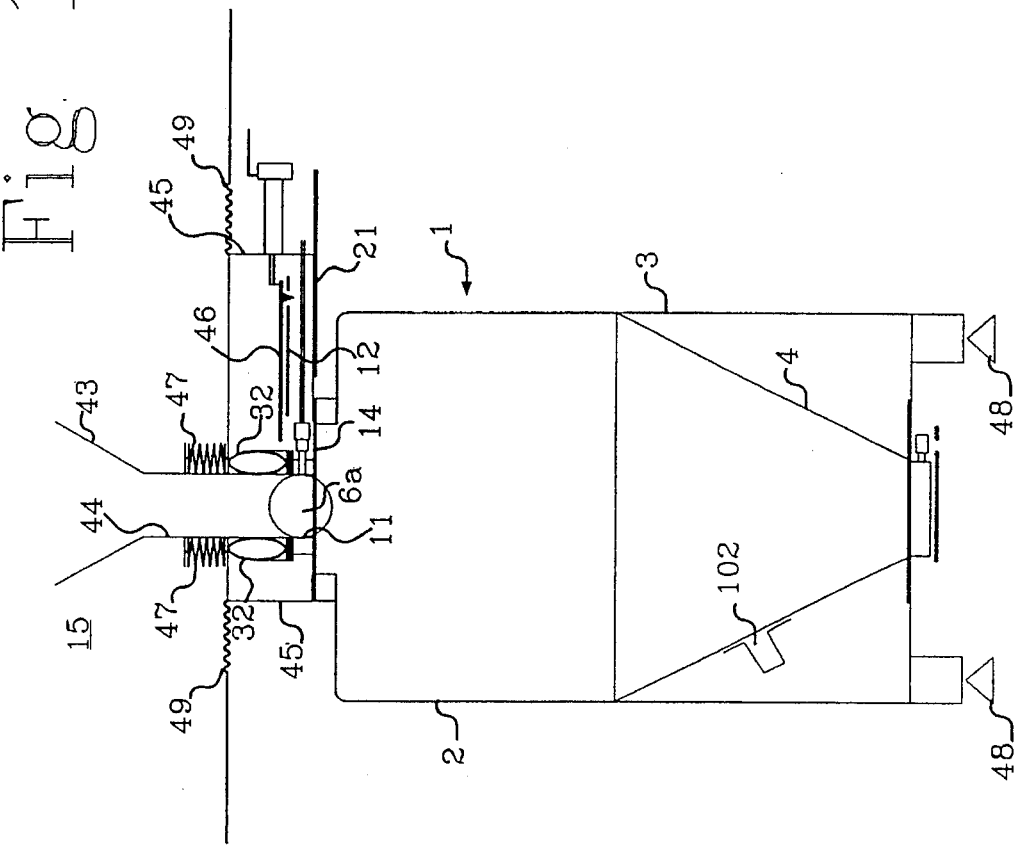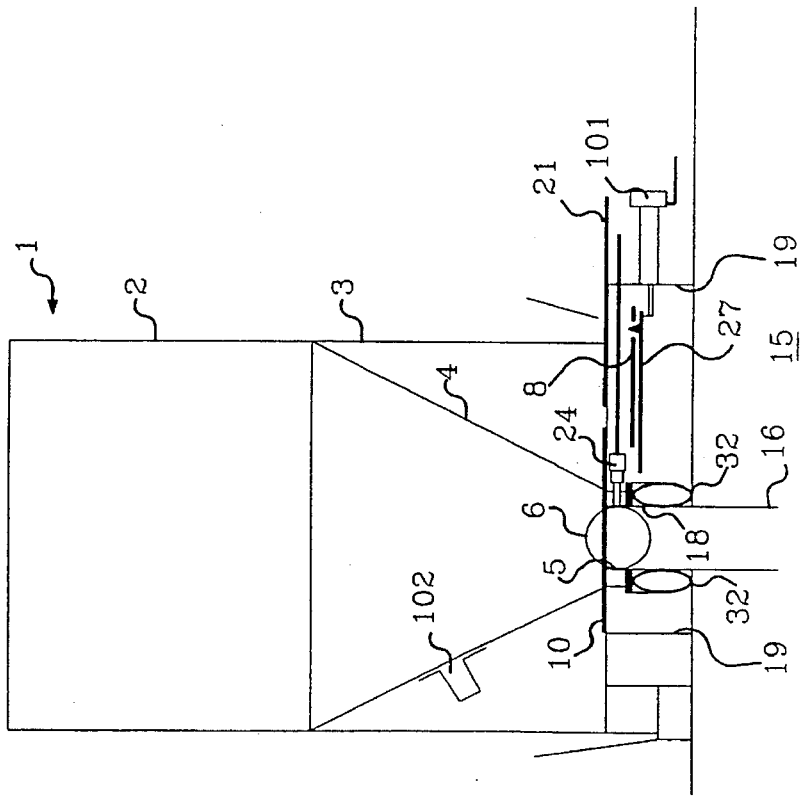

INSTALLATION AND METHOD FOR TRANSFERRING PRODUCTS FLOWING OUT UNDER GRAVITY

The present invention relates to installations for transferring products flowing out under gravity, such as liquids, powders, granulates, or small manufactured products such as sugar-coated pills, tablets, gelatine capsules, etc. from a container or a pipe towards another container or pipe situated at a lower level, as well as to a transfer method for these products.

The invention relates more particularly to the transfer of such products without the risk of contamination of the atmosphere and vice versa.

BACKGROUND OF THE INVENTION

1. Field of the invention

Use is generalized, at the present time, for the purpose of transporting and storing very varied materials in loose form, to using movable containers consisting of a receptacle, the lower part of which has the shape of a hopper exhibiting a discharge orifice and a means for closing off this orifice. These containers are also equipped with an underframe for supporting them and allowing them to be transported by handling vehicles.

In known transfer installations, the receptacles or containers to be discharged are brought, by known means, above the discharge station so that their discharge orifice, closed off by a valve of known type, is situated above the upper orifice of a pipe serving a piece of apparatus, generally situated in another premises, or of another receptacle; simple manoeuvering of the valve of the container brings about the outflow of the products to be transferred to the piece of apparatus or towards the second receptacle.

Similarly, the container includes an upper orifice via which it can be filled from a piece of apparatus via a pipe placed above it or from another receptacle.

In general, in installations of known type, the connections between containers or pipes are carried out manually.

In these installations of known type, a certain amount of particles of the products to be transferred escapes into the ambient atmosphere, during the displacement of the container and the transfer of the product.

The consequences of this pollution may, in some cases, be dire, especially when these installations are involved in the feeding of machines used in the pharmaceutical field and, in particular, when there is a risk of cross-contamination or when there is handling of toxic products, among which mention may be made of hormonal products, products which cause an allergic reaction, cytostatic products or other products.

Another problem which exists, especially in the pharmaceutical and foodstuffs sectors, is that ensuring that products are transported and transferred under conditions of strict sterility, asepsis or very great cleanliness.

One of the problems to be solved, in this sort of piece of apparatus, therefore consists, especially, in producing, at all moments, and particularly during the connection and transfer phases, sealing which is as complete as possible of each receptacle or pipe individually, and between each receptacle or pipe and the surrounding premises.

Another problem consists in seeing to it that the connections and transfer of products are carried out without direct contact with the staff, and preferably, in an entirely automated fashion.

2. Description of the Prior Art

European Patent Application EP-A-0,384,826 discloses an installation for transferring products flowing out under gravity from the lower orifice of a receptacle into receptacles or machines situated at a lower level, through use of a vertical chute. The installation includes, on the one hand, a first plate mounted on guides joined to the chute, sliding between a position in which the upper orifice of the chute is covered over and a position in which this orifice is cleared, on the other hand, a second plate mounted on guides fixed to the container to be emptied, sliding relative to the latter, between a position in which the lower orifice of the container is covered over and a position in which the said orifice is cleared, means being provided so that, during the displacement of the container in a horizontal plane, the movements of these two plates sliding on their respective guides are synchronous, but in opposite directions of.

In its preferred embodiment, the synchronous movements of the two sliding plates are ensured directly by a horizontal translational movement of the container, and in particular with the aid of magnets.

One problem which is not solved in this installation is that, although during all the operations of displacement of the container and transfer of products the orifices of the container and of the chute are always covered over, sealing is not complete. Indeed, a slight amount of play must be maintained between the orifices and the plates which cover them over in order to allow these plates to slide. As a result, fine particles may still escape into the ambient air.

Furthermore, a direct communication still exists between the two orifices and the ambient atmosphere after the plates have been pulled back and before the union is made between the container and the chute.

Document EP-A-0,092,008 describes a device for transferring, material in loose form under gravity, from one container towards a discharge hopper. The lower orifice of the container is closed by a sliding cover, lined with a butterfly valve. A movable sleeve tube makes it possible to produce a sealed connection between the container and since the discharge hopper does not have closure means, this device does not make it possible to avoid a certain amount of transferred material being dispersed into the atmosphere.

Patent Application FR-A-2,077,451 describes a device intended to produce a leaktight joint between a container and a discharge station including a chassis provided with a fixed part and a movable part.

The device described in FR-2,077,451 also makes it possible to produce a leaktight joint between the two enclosures solely during the transfer phase, it does not make it possible to avoid contamination of the surrounding medium. The extent to which the device is hermetic as regards to the atmosphere is no longer ensured as soon as contact between the station and the container is broken; what is more, the station does not include a hermetic cover. Moreover, if particles infiltrate into the device during transfer, they may be dispersed into the ambient atmosphere.

DE-A-1,034,549 describes a union device intended to avoid the spread of dust during the transfer of solid materials between a hopper and a translocation vehicle, this device especially includes a system for sucking up dust. This suction device is not, however, separated from the two receptacles by a leaktight union; consequently, it is in direct contact with the materials transferred. Such a device does not avoid contamination between the hopper, the vehicle, and the atmosphere, which is contrary to the goal sought here.

FR-A-2,640,598 describes a device for transferring products, in which the devices for closing off two containers are mechanically coupled so as to ensure simultaneous actuation.

The hermetic nature of this device is provided solely by the juxtaposition of the two closing-off devices, which is insufficient to avoid any contamination with the atmosphere, it being especially possible for particles to become housed between the external faces of the two covers.

U.S. Pat. No. 3,870,168 describes a device for transferring powdered materials, which is equipped with an air curtain reducing the risk of a cloud of powdered particles escaping during the transfer of material. Such an air curtain applies only to certain types of transfer and does not in itself solve the problem posed here.

These various known transfer devices additionally do not make it possible to obtain sterile transfer.

Consequently, large work zones must be considered as "contaminated". It is therefore necessary to provide, often at high cost, devices for separating these zones from one another and for protecting the outside environment from pollution (limited access, decontamination zones, elaborate systems for filtering the ambient air, etc.).

It is also necessary to provide the workers moving around in these zones with adequate protective equipment.

BRIEF SUMMARY OF THE INVENTION

The object of the present invention is to overcome these drawbacks and to provide a device making it possible to produce a quick junction in which the danger of pollution is eliminated both as regards to the ambient atmosphere and as regards to the product transported.

One of the objects of the invention is also to obtain conditions of transfer such that the contamination by the products handled can be confined to inside the manufacturing premises and the storage containers.

Another object of the present invention is to provide an installation in which all the connections and operations may be performed automatically, and therefore without any risk for the operators.

The subject of the invention is a device for transferring, without contamination, products flowing out from an upper receptacle or upper pipe including an orifice pointing downwards, towards a lower receptacle or lower pipe situated at a lower level than the previous one and including an orifice pointing upwards; each orifice of these receptacles or pipe can be closed off by a cover; this device includes —a hermetic enclosure covering the orifice of one of the receptacles or pipes, shaped such that the mouth of the orifice of the other receptacle or pipe can be inserted therein, the said enclosure including, on the same side as this other receptacle or pipe, an access which can be closed off;

—first closing-off means for isolating the inside volume of the enclosure with respect to the ambient atmosphere when another receptacle or pipe is not connected up thereto, and actuating means for these first closing-off means;

—second closing-off means for isolating the inside volume of the enclosure with respect to the ambient atmosphere when the mouth of another receptacle or pipe is inserted therein;

—means capable of opening the respective covers of the two receptacles or pipes when their orifices are facing each other and when the enclosure is isolated from the ambient atmosphere by the second closing-off means.

This device includes, very advantageously, means for injecting a gaseous fluid into the volume of the enclosure and/or for sucking a gaseous fluid out of the volume of the enclosure. These means are preferably designed to create a flow of gas with turbulence. This flow of gas is preferably subjected to the action of filtering means.

Another significant advantage of this arrangement is that the inside atmosphere of the enclosure can be renewed completely depending on the products to be transferred; it is thus possible to inject dry air in the case of hygroscopic products, sterile air or a sterilizing gas for handling under aseptic conditions, an inert gas for oxidizable materials or materials giving rise to a danger of explosion. The small internal volume of the enclosure (compared to that of the receptacles or of the premises served) renders this arrangement particularly effective and economically advantageous.

According to an advantageous mode, the respective covers of the two receptacles or pipes include mutual securing means, such that the two covers may be actuated simultaneously by one and the same opening means.

The second closing-off means advantageously include a flange of suitable shape to be connected up hermetically to the access of the said enclosure.

According to an embodiment which is advantageous for the maintenance of the installation, the enclosure includes, opposite its access, a hatch allowing access to be gained to the inside of the said enclosure.

The downwards-pointing orifice of the upper receptacle or of the upper pipe is preferably closed by a valve.

In this case, the means for actuating the said valve are advantageously located at least partially inside the enclosure.

The subject of the invention is also a container including a receptacle supported by an underframe, the said receptacle including, at its lower part, a hopper, the said hopper ending at the bottom in an end pierced with an orifice and closed by a movable cover, capable of being connected to the enclosure of a device as described hereinabove and including a closing-off means capable of interacting with corresponding means for isolating the inside volume of the enclosure with respect to the ambient atmosphere when the end of the hopper is inserted into the said enclosure.

This container preferably also includes, at its upper part, an orifice, the mouth of which points upwards, closed by a movable cover, capable of being connected to the enclosure of a device as described hereinabove and including a closing-off means capable of interacting with a corresponding means situated on the enclosure in order to isolate the inside volume of the said enclosure with respect to the ambient atmosphere when the mouth of its orifice is inserted into the said enclosure.

The subject of the invention is also a method for transferring, without contamination, products flowing out under gravity from an upper receptacle or upper pipe including an orifice, the mouth of which points downwards, towards a lower receptacle or lower pipe situated at a lower level than the first and including an orifice, the mouth of which points upwards, it being possible for each of these orifices to be closed off by a movable cover. This method includes the following operations:

a) bringing the respective orifices of the receptacles or pipes to face each other axially b) providing an enclosure covering the orifice of a first container or pipe, the inside volume of the said enclosure being separated from the ambient atmosphere by first closing-off means c) opening the first closing-off means of the enclosure d) inserting the mouth of the orifice of the second container or pipe into the enclosure e) separating the inside volume of the enclosure from the ambient atmosphere by second closing-off means respectively secured to the enclosure and to the mouth of the second container or pipe f) opening the respective covers of the two receptacles or pipes g) axially displacing the mouth of the orifice of the first container or pipe such that it connects up hermetically to the mouth of the second container or pipe h) allowing the products to be transferred to flow out i) repeating the above operations in the reverse order after an adequate amount of products has been transferred.

In this method a flow of gas is advantageously passed into the enclosure after the operation (d) or after the operation (g). According to a particular method of operation, the passage of gas is prolonged while operations (e), (f) and (g) are in progress.

The axial displacement of the orifice of the first receptacle or pipe (operation e) is advantageously carried out by virtue of an inflatable chamber secured to a rim of the mouth of the said first receptacle or pipe.

The outflow of the product, (operation h) is preferably carried out by the actuation of a valve located at the lower part of the upper receptacle or pipe.

Another advantage of the invention is that of considerably improving the working conditions and simultaneously reducing the costs connected with the reduction in pollution from an industrial complex.

These measures apply particularly to the transfer of toxic products, products causing an allergic reaction, to hormonal, cytostatic, sterile products and to radioactive substances.

The device and method according to the invention also prove advantageous in the case of transferring explosive powders or mixtures, particularly sugars, cephalosporins.

BRIEF DESCRIPTION OF THE SEVERAL DRAWINGS

Other characteristics and advantages of the invention will emerge from the description which will follow, of a possible embodiment, reference being made to the appended drawings in which:

FIGS. 1 and 2 are diagrammatic sectional views of a container according to the prior art serving a pipe, without an adequate transfer device.

FIG. 3 is a general view of a section in a vertical plane of a container equipped with a device according to the invention.

FIG. 4 is a sectional view in a vertical plane perpendicular to that of FIG. 3 (with a break) of the same container.

FIG. 5 is a view in horizontal section in the plane V—V of the container of FIG. 4.

FIG. 7 is a diagrammatic sectional view in a plane perpendicular to the plane of FIG. 3 of the device in which the lower orifice of a container is inserted.

FIG. 8 is a plan view of a section in the plane VIII—VIII of FIG. 10, the container being in position.

FIG. 9 is a view in the same plane as in FIG. 4, the device being ready for transfer.

FIG. 10 is a general view in vertical section of the device in its greatest length.

FIGS. 11 to 15 are diagrammatic views of the various steps of the method for opening the transfer device according to the invention.

FIG. 16 is a diagrammatic view showing a transfer of products through the upper orifice of a container.

Figure 6:
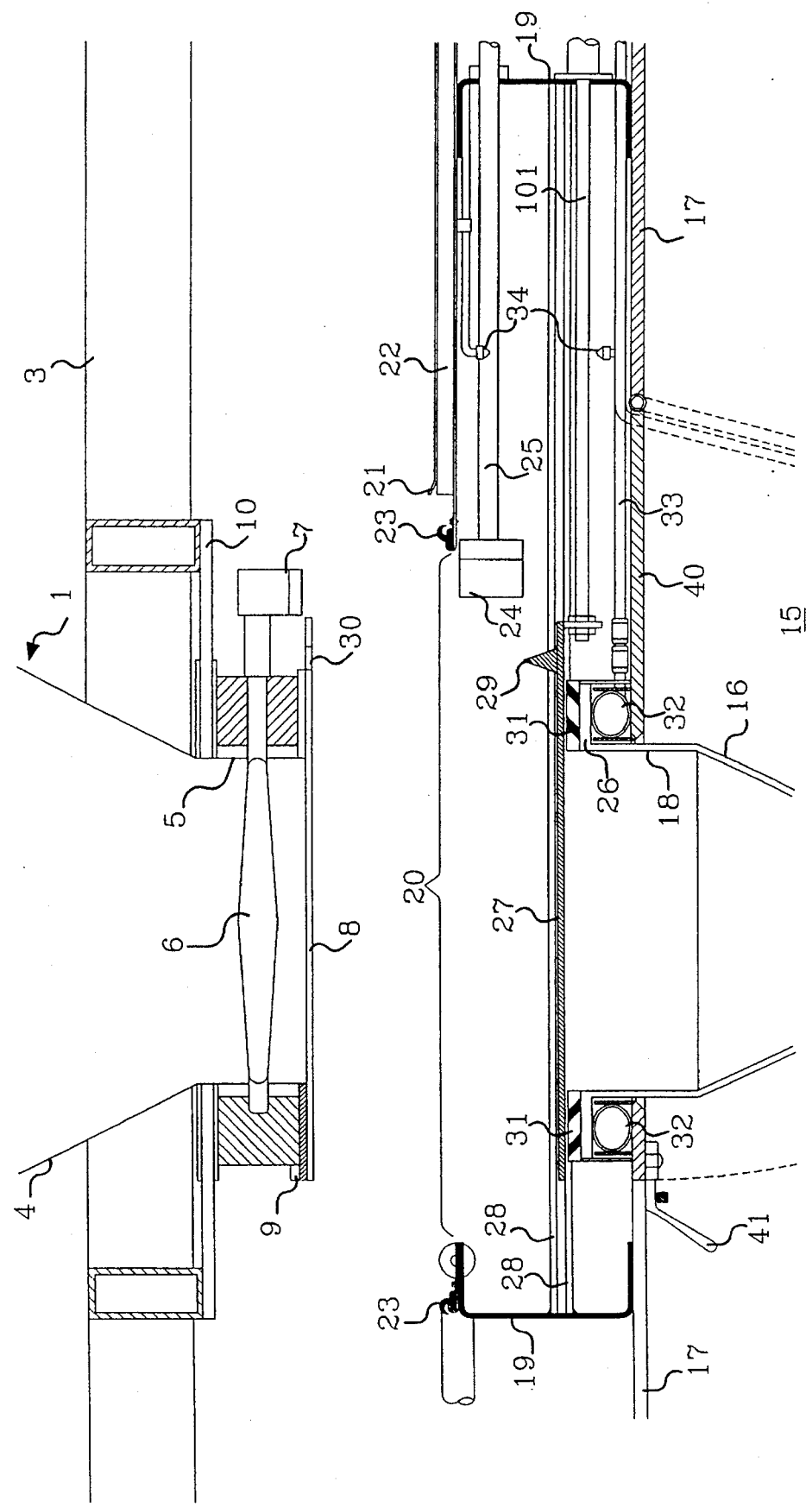
FIG. 6 is a diagrammatic sectional view in the same plane as in FIG. 4, of the open transfer device for putting the lower orifice of a container in place.

It is clearly emphasized that this is merely one embodiment, and that any other shapes, proportions, and arrangements could be adopted without departing from the scope of the invention.

DETAILED DESCRIPTION OF THE DRAWINGS

FIGS. 1 and 2 illustrate a series of typical problems of pollution and of contamination which are posed during a transfer of products, and which none of the devices according to the prior art can solve totally. In order to avoid confusion, with the device according to the present invention, the numbering of the elements relating to FIGS. 1 and 2 is preceded by a —0—.

The container 01 according to the prior art is represented just after a transfer of products to a pipe 02 serving a piece of apparatus 03 situated in premises 04 away from the discharge site 05.

In order to avoid, especially, toxic particles or pathogenic microorganisms being able to escape from the premises 04, the atmosphere of these premises 04 is regulated by a piece of apparatus 06 and maintained constantly at a reduced pressure ($-\Delta p$) with respect to the pressure of the discharge premises 05.

When transfer has finished, the container 01 is disconnected from the pipe 02 with which it had been joined in more or less sealed fashion.

Since the pipe 02 does not have adequate closure means, foreign particles 07 in suspension in the atmosphere at the transfer site 05 are sucked up into the controlled atmosphere of the premises 04, which they contaminate.

Particles 08 remaining stuck to the external face of the base of the container 01 according to the prior art are dispersed into the transfer premises 05. Particles 09 sticking to the mouth of the pipe 02 also contaminate the atmosphere of the premises 05, possibly deteriorate on contact with it, and are thus likely during subsequent transfer to contaminate, the products feeding the piece of apparatus 03 and the premises 04.

FIG. 2 shows a container 01 according to the prior art just after transfer through a pipe 02 towards a piece of apparatus 010 situated in a "clean room" 011.

In order to avoid dust, particles and microorganisms coming from the transfer site 05 contaminating the "clean" atmosphere of the premises 011, this atmosphere is treated and kept at an overpressure ($+\Delta p$) with respect to the pressure of the transfer site 05 by a piece of apparatus 06.

When transfer has finished, the container 01 is detached from the pipe 02.

Since this pipe 02 does not have adequate closure means, a flow 012, loaded with particles 013 of transferred product and of substances 014 produced or released by the piece of apparatus 010, is expelled towards the atmosphere of the transfer site 05.

The particles 08 remaining stuck to the outer face at the base of the container and dirt 09 sticking to the mouth of the pipe 02, as explained in FIG. 1, are likely to pollute the atmosphere of the transfer site 05. Furthermore, during subsequent transfer, these particles 08, possibly deteriorated, and dirt 09 risk being introduced back into the "clean" atmosphere of the premises 011.

It is, moreover, evident that, during transfer itself, the product transferred, possibly in aseptic conditions, into the container 01 cannot be placed in contact with the dirty atmosphere of the transfer site 05.

These same phenomena arise, conversely, when a finished product is to be transferred from premises 04 or 011 to a container 01 situated below.

FIGS. 3 to 5 show a container 1 for products flowing out under gravity, which container is equipped to be used with the transfer device according to the invention. The container 1 includes a quadrangular receptacle 2 with rounded corners, supported by a framework 3 which forms the underframe and allows it to be handled. The lower part of the receptacle forms a hopper 4. The lower end of the hopper 4 includes the mouth of an orifice 5 which can be closed off, and which forms the first part of the transfer device according to the invention. This orifice 5 is closed by a valve 6 which, in this embodiment, is a butterfly valve 6. This valve is actuated by a key 7 which projects laterally. The downstream side of the valve 6 is closed off in leaktight manner by a cover 8 mounted on slides 9. A flange 10, the role of which will be explained later, extends right around the mouth of the hopper 4, substantially parallel to the cover 8 and set back with respect to the plane of this cover 8. The outer dimensions of the flange 10 are larger than the dimensions of the cover 8.

The upper part of the container 1 assumes the same configuration as the lower part, but in the opposite manner.

In effect, the container 1 includes, at its upper part, the mouth of an orifice 11 pointing upwards, also closed by a butterfly valve 6a and by a leaktight cover 12 mounted on slides 13. A flange 14, situated set back downwards with respect to the cover 12 extends substantially parallel to the cover 12 around the mouth of the orifice 11. The outer dimensions of the flange 14 are larger than the outer dimensions of the cover 12.

In the particular example described in FIGS. 6 to 15, the contents of the container 1 are intended to be transferred into treatment premises 15 located at a lower level. A pipe 16 connected to the treatment premises 15 passes through the base plate 17 separating the transfer site and the treatment premises 15.

It will be noted that the pipe 16 is generally connected up to a piece of apparatus situated in premises other than the transfer site; however, it may equally well feed other devices, receptacles, etc.

The details of the transfer device are shown more particularly in FIGS. 6 to 10.

The mouth of the upper orifice 18 of the pipe 16 is covered by an enclosure 19, which is closed downwards by the plate 17. The enclosure 19 includes, at its upper part, an access 20 into which the mouth of the hopper 4 of the container 1 may be inserted vertically.

The access 20 of the enclosure 19 can be closed off by a first closing-off means 21, in this case the movable cover 21 (featured in dotted lines in the open position in FIG. 8) mounted on slides 22. A seal 23 fixed to the perimeter of the access 20 provides sealing between the ambient atmosphere and the inside volume of the enclosure 19 when the cover 21 is closed.

Two thrust cylinders 22a visible in FIG. 8 are located laterally along the enclosure 19 and ensure the displacement of the cover 21, on request.

Means for actuating the valve of the container are located actually inside the enclosure 19. These means include a coupling system 24 interacting with the key 7 of the valve 6. The coupling system 24 is connected by an axially pivoting rod 25 to a thrust cylinder 25a. The latter is situated outside the enclosure 19 as seen in FIGS. 8 and 10.

As seen in FIG. 6, the mouth of the pipe 16 is surrounded by a horizontal rim 26 and it is closed off by a movable cover 27, mounted on slides 28. This cover 27 carries studs 29 capable of interacting with corresponding housings 30 formed in the cover 8 of the container 1. In this way, when the cover 27 is displaced (as shown in FIG. 9) a simultaneous opening of the two covers 8 and 27 is obtained.

A peripheral seal 31 mounted on the rim 26 of the pipe 16 provides sealing between the pipe 16 and its cover 27 when the latter is closed. An inflatable peripheral chamber 32 connected up to a hose for supplying compressed air 33 is located under the rim 26 of pipe 16.

As shown in FIGS. 9 and 10, when the inflatable chamber 32 is pressurized, it generates an upward thrust which is applied to the rim 26 of the pipe 16 and induces a vertical displacement of the mouth upwards, which makes it possible to obtain hermetic contact between the end of the hopper 4 and the pipe 16.

The enclosure 19 also includes first injection means 34, which here have the form of two nozzles 34, capable of sending a fluid onto the lower faces and upper faces of the secured-together covers 8, 27 when they are pulled back, in order to clear them of any trace of the transferred products or of particles coming from the ambient medium.

The device according to the invention moreover includes other means for injecting a gaseous flow into the enclosure 19. In the example shown in FIGS. 7 and 8, a gas inlet 35 communicates with the inside of the enclosure 19 through a filter 36 and a perforated plate 37.

Another perforated plate 37 communicating with an air outlet 38 is located so that the contact zones can be swept by the gaseous flux which passes through the enclosure 19.

The air outlet 38 is connected by a suction means (not represented) to an installation for treating or filtering the gaseous flow (installation not represented) which takes up the particles likely to be exhausted. Ultraviolet radiation tubes 39 are located as a complementary measure, on the passage of the gaseous flow so as to enhance the sterlization inside the enclosure 19 during and after the transfer process.

Since the inside volume of the enclosure 19 is very small compared to that of the receptacle 2 and with regard to that of the receptacle or of the premises served by the pipe 16, it is possible economically to treat this confined inside volume during transfer or even after transfer.

Particles which would have escaped can thus be recovered or neutralized at the cost of a very low energy consumption. Since these particles which have "escaped" during a transfer may, for example, be pathogenic microorganisms or toxic dust, it is understood that the transfer device according to the invention makes it possible to eliminate them much more effectively than if the whole of the atmosphere of the site in which the transfer is in progress had to be treated.

Since the transfer device is one with total sealing, it makes it possible to treat, without problem, powders which form mixtures which detonate in the presence of air (especially powdered sugar).

As is best seen in FIG. 10, a hatch 40 is made in the face of the enclosure 19 communicating with the treatment premises 15. This hatch may be unlocked by actuating manual locking means 41. This particular feature makes it possible to gain access to the inside of the enclosure 19 (for example for cleaning) from the premises 15 without the risk of contamination towards the atmosphere when the outer cover 21 of the enclosure 19 is closed.

As can be noticed in FIGS. 8 and 10, strict centering of the container 1 on the enclosure 19 is obtained by guide means 42 in which the framework 3 of the container 1 may be housed.

The underframe rests on these guide means 42 such as to transfer almost all of the weight of the container 1 to it. The flange 10 is applied, at this moment, against the seal 23 at the enclosure 19 with just enough force to ensure good sealing. During the whole time during which the end of the hopper 4 is inserted into the enclosure 19, the seal 23 and the flange 10 operate like second closing-off means for isolating the inside volume of the enclosure 19 from the ambient atmosphere. No appreciable vertical force due to the weight of the container 1 is applied to the cover 8 which, whilst almost adjoining the cover 27, can slide unimpeded along its slides 9.

It is clear that other closing-off means can be used for isolating the inside volume of the enclosure from the atmosphere during this phase. Thus, the end of the hopper may be shaped to the dimensions of the access 20 and/or a flexible seal (particularly an inflatable seal) may provide the sealing of the enclosure in a similar fashion. It is also possible to use, for example, an iris-type opening (instead of the sliding cover 21) which adapts to the dimensions of the end of the hopper.

FIGS. 11 to 15 represent the various steps in the transfer method according to the invention.

All the steps may be controlled either manually, or produced automatically and remotely without requiring the presence of staff on the premises of the operations. What is more, all the operations are performed without any contact of the product with the outside surroundings.

In step 1, represented in FIG. 11, the container 1 is transported by a handling vehicle 100, in this case an automatically guided vehicle (AGV). When this vehicle 100 arrives in front of the transfer station corresponding to the treatment premises 15 assigned to it, it automatically places the container 1 in position, the orifice 5 of the container 1 being brought vertically in line with the orifice 18 of the pipe 16 enclosed in the enclosure 19 of the discharge station. After checking that the cover 21 of the enclosure 19 is closed, that the inflatable circular chamber 32 is inflated, and that the coupling system 24 for the valve 6 is in the closed position, the vehicle 100 progressively lowers the container 1, the container 1 also being guided by the positioning means 42 interacting with the framework 3 forming the underframe.

In step 2, represented in FIG. 12, a detector, activated by the lowering of the container 1, controls the opening of the first closing-off means of the enclosure 19, here produced by the sliding of its cover 21.

In step 3, represented in FIG. 13, the cover 21 is completely pulled back from the access 20 of the enclosure 19. The container 1 is lowered by the vehicle 100 until it comes to rest on its underframe 3. These second means for closing off the enclosure then come into play. In effect, the flange 10 of the container 1 then rests on the seal 23 of the enclosure 19 and thus affords sealed closure of this enclosure. Correct execution of step 3 is important in the sense that sealing thus obtained will make it possible to perform all the subsequent manoeuvres in a strictly controlled atmosphere. As outlined above, other known means can be used for temporarily isolating the volume of the enclosure from the external atmosphere.

Through the same lowering movement of the container, the studs (best represented in FIG. 6) mounted on the cover 27 of the pipe 16 become inserted in the corresponding housings in the cover 8 of the container 1. During the same vertical movement, the key 7 of the valve 6 is inserted into the coupling system 24.

The vehicle 100 can, at this stage, detach itself from the container and move away.

A gaseous flow is then sent into the enclosure 19. This flow may, as required, simply be filtered ambient air or air from the surroundings with a possibly controlled moisture content, or a sterile or sterilizing gas or any other appropriate gas. The sweeping and/or contact with the gas is maintained during the lapse of time required to exert its sanitary, dust-removal, sterilizing or some other effect.

In step 4, represented in FIG. 14, the pressure in the inflatable chamber 32 is released so as to allow the lateral displacement of the respective covers 8, 27 of the two orifices 5, 18. The covers 8, 27 simultaneously uncover their respective orifice 5, 18 via a sliding movement actuated by a thrust cylinder 101.

In step 5, represented in FIG. 15, the circular chamber 32 is reinflated and the mouth of the pipe 16 is driven upwards against the end of the hopper 4, thereby providing a sealed coupling. Depending on the case, a new phase of sweeping using the gaseous flow may again be performed at this stage.

The device is then ready for transferring the product. The operator can then command the opening of the butterfly valve 6, by rotating the coupling system 24.

The use of a butterfly valve 6 makes it possible to give the whole of the transfer device a very small height whilst easily controlling the flow rate of materials tipped out. It is, however, obvious that depending on the requirements, other types of valves, particularly slide valves, may equally well be used.

In a particular and independent manner, the device includes a pneumatic vibrator 102 represented in FIG. 10, facilitating the outflow of the product. The strict positioning of the container 1 on the transfer station makes it possible to provide an automatic connection 103 when the container 1 is put in place.

The reverse operations take place after the product or desired quantity of product have been transferred:
—closing the valve 6,
—sweeping the enclosure 19 with a gaseous flow,
—deflating the circular chamber 32 causing the lowering of the orifice 18 of the pipe 16,
—simultaneous closure of the covers 8, 27 by actuating the thrust cylinder 101,
—inflation of the circular chamber 32, which ensures perfect sealing between the sliding cover 27 and the peripheral seal 31 of the pipe 16,
—repeated sweeping of the enclosure 19,
—vertical transportation of the container 1 by a handling vehicle 100,
—closure of the enclosure 19 by actuation of the first closing-off means, here by sliding its cover 21.

The device according to the invention also makes it possible to repeat the sweeping and/or sterilization of the inside volume of the enclosure 19 between two transfer operations (depending on the time elapsing between two operations) or equally well after a time during which the installation has been shut down.

The various steps of coupling and transferring products described hereinabove apply completely similarly to the case in which a container 1 is filled via its upper orifice 11 from a pipe 43 overhanging it, as illustrated in FIG. 16.

The pipe 43 is, for example, connected up downstream of a piece of apparatus situated in a treatment premises 15. It includes an orifice 44, the mouth of which points downwards, and is generally equipped with a valve (not represented) controlling or regulating the flow rate of the product to be transferred, and of a hermetic cower 46. The orifice 44 of the pipe 43 is covered by an enclosure 45 similar to the enclosure 19 described previously. The enclosure 45 includes the same elements as the enclosure 19, but in the reversed top-bottom position.

In this embodiment, the container 1 is coupled up to the pipe 43 in the said enclosure 45 by an upwards movement, the various steps being identical to those described previously, although the top-bottom orientation is reversed. Thus, it may be necessary to provide return means 47 for raising the mouth 44 of the pipe 43 back up.

It is obvious that, depending on the configuration of the installation, provision may be made for the container 1 to couple up to the pipe 43 equally well by a horizontal translation as by any combination of rotary movements.

At any moment, whether the container 1 is present or otherwise, whether in the coupling phase, product transfer phase, or uncoupling phase, it is obvious that the treatment premises 15 in which the product being handled always remains isolated in a perfectly sealed manner with respect to the premises in which storage and transfer of this product in the container 1 are carried out.

The container 1 may be combined with a device 48 for measuring weight, making it possible directly to check the amounts of product which are tipped therein in weighing stations. During weighing, the enclosure 45 and pipe 43 are secured to the container 1 and therefore form part of the tare. In order to maintain sealing of the premises whilst allowing free movement of the scale, the union with the floor takes place via a flexible seal 49.

What is claimed:

1. A device for transferring, without contamination, products flowing out under gravity from an upper receptacle including a lower orifice, the mouth of which points downwards, towards a lower pipe situated at a lower level than the upper receptacle and including an upper orifice, the mouth of which points upwards, wherein each orifice of said upper receptacle and lower pipe is closed off by a moveable cover, the said device being comprised of:

a hermetic enclosure defining an inside volume and surrounding the orifice of said lower pipe, and including an access opening shaped such that the mouth of the orifice of the upper receptacle is insertable therein;

first closing-off means for closing said access opening and isolating the inside volume of the enclosure with respect to the ambient atmosphere when said upper receptacle is not inserted therein, and actuating means for opening said first closing-off means such that said upper receptacle is capable of being inserted therein;

second closing-off means for isolating the inside volume of the enclosure with respect to the ambient atmosphere when the mouth of said upper receptacle is inserted therein;

means capable of opening the respective covers of the upper receptacle and lower pipe when their orifices are facing each other and when the enclosure is isolated from the ambient atmosphere by the second closing-off means;

means for injecting a flow of gas into the inside volume of the enclosure surrounding the respective mouths of the upper receptacle and lower pipe; and, means connected to the inside volume of the enclosure for sucking up the flow of gas.

2. A device according to claim 1, wherein the respective covers of the upper receptacle and lower pipe include mutual securing means, such that the two covers may be actuated simultaneously by one and the same opening means.

3. A device according to claim 1, wherein the second closing-off means include a flange adapted to be connected up hermetically to the access of the said enclosure.

4. A device according to claim 1, characterized in that the enclosure includes, attached at an end opposite its access, a hatch allowing access to be gained to the inside of the said enclosure.

5. A device according to claim 2 wherein the downwards-pointing orifice of the upper receptacle is closed by a valve and wherein means for actuating said valve are located at least partially inside the enclosure.

6. A device according to claim 1, wherein said receptacle includes a container, said container being comprised, at its upper part, of an upper orifice, the mouth of which points upwards, closed by another moveable cover, capable of being connected to a device including a second hermetic enclosure defining an inside volume and surrounding the orifice of a supply pipe and shaped such that the mouth of the upper orifice of the container can be inserted therein, the said second enclosure including, in a side facing the container, an access opening for receiving said upper orifice, said second enclosure including closing-off means capable of interacting with the container in order to isolate the inside volume of the said second enclosure with respect to the ambient atmosphere when the mouth of said orifice is inserted into the said second enclosure.

7. A method for transferring, without contamination, products flowing out under gravity from an upper receptacle including a lower orifice, the mouth of which points downwards, towards a lower pipe situated at a lower level than the upper receptacle including an upper orifice, the mouth of which points upwards, it being possible for each of these orifices to be closed off by a moveable cover which is comprised of the following operations:

a) bringing the respective orifices of the upper receptacle and lower pipe to face each other axially;

b) providing a hermetic enclosure defining an inside volume and surrounding the orifice of the lower pipe, the inside volume of the said enclosure being separated from the ambient atmosphere by first closing-off means;

c) opening the first closing-off means of the enclosure;

d) inserting the mouth of the orifice of the upper receptacle into the enclosure;

e) separating the inside volume of the enclosure from the ambient atmosphere by second closing-off means respectively secured to the enclosure and to the mouth of the upper receptacle;

f) blowing a flow of gas through the inside volume of the enclosure;

g) opening the respective covers of the upper receptacle and lower pipe;

h) axially displacing the mouth of the orifice of the lower pipe such that it connects up hermetically to the mouth of the upper receptacle;

i) allowing the products to be transferred to flow out;

j) repeating the above operations in the reverse order after an adequate amount of products has been transferred.

8. The method according to claim 7, wherein the flow of gas into the enclosure is prolonged during the operations f and h.

9. The method according to claim 7, further comprised of the following operation:
—blowing a flow of gas into the enclosure after the operation g.

10. The method according to claim 7, wherein the axial displacement of the orifice of the lower pipe (operation h) is carried out by virtue of an inflatable chamber secured to a rim of the mouth of the said lower pipe.

11. The method according to claim 7, wherein the outflow of the product (operation h) is carried out following the actuation of a valve located a lower part of the upper receptacle.

12. A device for transferring, without contamination, products flowing out under gravity from an upper pipe including a lower orifice, the mouth of which points downwards, towards a lower receptacle situated at a lower level than the upper pipe and including an upper orifice, the mouth of which points upwards, wherein each orifice of said lower receptacle and upper pipe is closed off by a moveable cover, the said device being comprised of a hermetic enclosure defining an inside volume and surrounding the orifice of said upper pipe, and including an access opening shaped such that the mouth of the orifice of the lower receptacle is insertable therein;

first closing-off means for closing said access opening and isolating the inside volume of the enclosure with respect to the ambient atmosphere when said lower receptacle is not inserted therein, and actuating means for opening said first closing-off means such that said lower receptacle is capable of being inserted therein;

second closing-off means for isolating the inside volume of the enclosure with respect to the ambient atmosphere when the mouth of said lower receptacle is inserted therein;

means capable of opening the respective covers of the lower receptacle and upper pipe when their orifices are facing each other and when the enclosure is isolated from the ambient atmosphere by the second closing-off means;

means for injecting a flow of gas into the inside volume of the enclosure surrounding the respective mouths of the upper receptacle and lower pipe; and, means connected to the inside volume of the enclosure for sucking up the flow of gas.

13. A device according to claim 12, wherein the respective covers of the lower receptacle and upper pipe include mutual securing means, such that the covers may be actuated simultaneously by one and the same opening means.

14. A device according to claim 12, wherein the second closing-off means include a flange adapted to be connected hermetically to the access of said enclosure.

15. A device according to claim 12, characterized in that the enclosure includes, attached at an end opposite its access, a hatch allowing access to be gained to the inside of said enclosure.

16. A device according to claim 13, wherein the downwards-pointing orifice of the upper pipe is closed by a valve and wherein means for actuating said valve are located at least partially inside the enclosure.

17. A device according to claim 15, wherein said receptacle includes a container, said container being comprised, at its lower part, of a lower orifice, the mouth of which points downwards, closed by another moveable cover, capable of being connected to a device including a second hermetic enclosure defining an inside volume and surrounding the orifice of a receiving pipe, and shaped such that the mouth of the low orifice of the container can be inserted therein, the said second enclosure including, in a side facing the container, an access opening for receiving said lower orifice, said second enclosure including a closing-off means capable of interacting with the container in order to isolate the inside volume of said second enclosure with respect to the ambient atmosphere when the mouth of said lower orifice is inserted into said second enclosure.

18. A method for transferring, without contamination, products flowing out under gravity from an upper pipe including a lower orifice, the mouth of which points downwards, towards a lower receptacle situated at a lower level than the upper pipe including an upper orifice, the mouth of which points upwards, it being possible for each of these orifices to be closed off by a moveable cover which is comprised of the following operations:

a) bringing the respective orifices of the lower receptacle and upper pipe to face each other axially;

b) providing a hermetic enclosure defining an inside volume and surrounding the orifice of the upper pipe, the inside volume of the said enclosure being separated from the ambient atmosphere by first closing-off means;

c) opening the first closing-off means of the enclosure;

d) inserting the mouth of the orifice of the lower receptacle into the enclosure;

e) separating the inside volume of the enclosure from the ambient atmosphere by second closing-off means respectively secured to the enclosure and to the mouth of the lower receptacle;

f) blowing a flow of gas into the enclosure;

g) opening the respective covers of the lower receptacle and upper pipe;

h) axially displacing the mouth of the orifice of the upper pipe such that it connects up hermetically to the mouth of the lower receptacle;

i) allowing the products to be transferred to flow out;

j) repeating the above operations in the reverse order after an adequate amount of products has been transferred.

19. The method according to claim 18, wherein the flow of gas into the enclosure is prolonged during the operations g and h.

20. The method according to claim 18, further comprised of the following operation:
—blowing a flow of gas into the enclosure after the operation h.

* * * * *